(12) United States Patent
Bond, III et al.

(10) Patent No.: US 6,655,749 B2
(45) Date of Patent: Dec. 2, 2003

(54) ACCELERATOR ACTUATED EMERGENCY BRAKING SYSTEM

(75) Inventors: John Vincent Bond, III, Inkster, MI (US); Gerald H Engelman, Plymouth, MI (US); Jonas Ekmark, Gothenburg (SE); Jonas L. Z. Jansson, Gothenburg (SE); M. Nabeel Tarabishy, Walled Lake, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,011

(22) Filed: Nov. 8, 2001

(65) Prior Publication Data

US 2003/0085612 A1 May 8, 2003

(51) Int. Cl.$^7$ ................................ B60T 13/00
(52) U.S. Cl. ................. 303/9; 701/76; 303/113.4; 303/114.1; 303/115.2
(58) Field of Search ................ 303/9, 3, 183, 303/113.1, 113.4, 113.5, 114.1, 115.2; 342/70, 71; 180/167, 168, 169; 307/10.1; 701/96

(56) References Cited

U.S. PATENT DOCUMENTS

| 4,073,359 | A | 2/1978 | Fujiki et al. |
| 4,146,108 | A | 3/1979 | Sato |
| 5,420,792 | A | 5/1995 | Butsuen et al. |
| 5,467,284 | A | 11/1995 | Yoshioka et al. |
| 5,485,892 | A | 1/1996 | Fujita |
| 5,635,922 | A | 6/1997 | Cho et al. |
| 5,699,040 | A | 12/1997 | Matsuda |
| 5,924,508 | A | 7/1999 | Clauss et al. |
| 5,941,608 | A | 8/1999 | Campau et al. |
| 5,952,939 | A | 9/1999 | Nakazawa et al. |
| 6,058,347 | A | 5/2000 | Yamamura et al. |
| 6,061,015 | A | 5/2000 | Sugimoto |
| 6,070,682 | A | 6/2000 | Isogai et al. |
| 6,084,508 | A | 7/2000 | Mai et al. |
| 6,105,705 | A | 8/2000 | Faye |
| 6,131,063 | A | 10/2000 | Seki et al. |
| 6,189,987 | B1 | 2/2001 | Shimizu |
| 6,204,569 | B1 | 3/2001 | Specht |
| 6,226,593 | B1 | 5/2001 | Kurz et al. |
| 6,293,361 | B1 | 9/2001 | Mueller |
| 6,405,121 | B2 | 6/2002 | Tamura et al. |
| 6,415,230 | B1 | 7/2002 | Maruko et al. |

Primary Examiner—Christopher P. Schwartz
Assistant Examiner—Melanie Torres
(74) Attorney, Agent, or Firm—Frank A. MacKenzie

(57) ABSTRACT

An enhanced emergency brake assist system includes an accelerator pedal operated by the driver coupled to a braking system and used to control the overall vehicle speed. When a forward detection apparatus detects an imminent contact, the braking system automatically applies braking force to the vehicle after the driver fully releases the accelerator pedal. The braking force may be reduced when the driver or passenger are unbuckled.

13 Claims, 4 Drawing Sheets

ACCELERATOR ACTUATED EMERGENCY BRAKING SYSTEM

BACKGROUND OF INVENTION

The present invention relates generally to brake systems for automotive vehicles, and more particularly, to an enhanced emergency brake assist system.

Automotive brake systems are the result of a long evolutionary process and are one of the most important systems in a vehicle. Typical brake systems include a master cylinder, located under the hood, which is directly connected to a brake pedal. The master cylinder converts mechanical pressure applied to the brake pedal into a proportional amount of hydraulic pressure. This hydraulic pressure is used to actuate the vehicle brakes. Many brake systems also use the engine's energy to add pressure to the master cylinder.

To improve upon standard braking systems, various automatic braking systems have been suggested in the prior art. U.S. Pat. No. 6,189,987 describes a brake force control apparatus that will not generate an unnecessarily large brake force when emergency braking is performed while the vehicle is traveling on a rough road or riding over a step. U.S. Pat. No. 5,924,508 describes a process for carrying out an automatic braking operation when the return speed of the accelerator pedal exceeds a threshold value.

The '987 patent is equipped with a fluid pressure generating mechanism which generates an assist hydraulic pressure in which a pump is used as a fluid pressure source. The fluid pressure generating mechanism generates the assist hydraulic pressure based on a driving signal supplied from a control circuit. When the brake pedal is operated at a speed higher than a predetermined speed, the control circuit determines that an emergency braking is carried out by the driver, and outputs to the fluid pressure generating mechanism a drive signal which requests a maximum assist hydraulic pressure.

However, besides a situation in which the driver intentionally performs the emergency braking, the brake pedal may be pressed at a high speed if the vehicle is traveling on a rough road or the vehicle rides over a step on the road. According to the above conventional apparatus, the brake assist control is performed without exception when the brake pedal is depressed at a speed equal to or higher than the predetermined value irrespective of the vehicle traveling environment. Hence, the conventional apparatus may generate an unnecessarily large braking force when the vehicle is traveling on a rough road or passing a step.

Additionally, recent data indicates that some drivers do not apply all available braking force during emergency situations. This phenomenon occurs even when a collision is imminent. The system described in the '987 patent is still very reliant upon the actions of the driver.

The disadvantages associated with these conventional automatic emergency braking techniques have made it apparent that a new technique for automatic emergency braking is needed. The new technique should reduce overall vehicle kinetic energy while enhancing driver performance. The present invention is directed to these ends.

SUMMARY OF INVENTION

It is, therefore, an object of the invention to provide an improved and reliable enhanced emergency brake assist system.

In accordance with the objects of this invention, an enhanced emergency brake assist system is provided. The enhanced emergency brake assist system includes an accelerator pedal operated by the driver coupled to a braking system and used to control the overall vehicle speed. When a forward detection apparatus detects an imminent contact, the braking system automatically applies braking force to the vehicle after the driver fully releases the accelerator pedal. The braking force may be reduced when the driver or passenger are unbuckled.

The present invention thus achieves an improved emergency brake assist system. The present invention is advantageous in that it enhances driver braking performance during imminent contact situations. Additionally, the present invention maintains standard braking levels when an occupant is unbelted.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
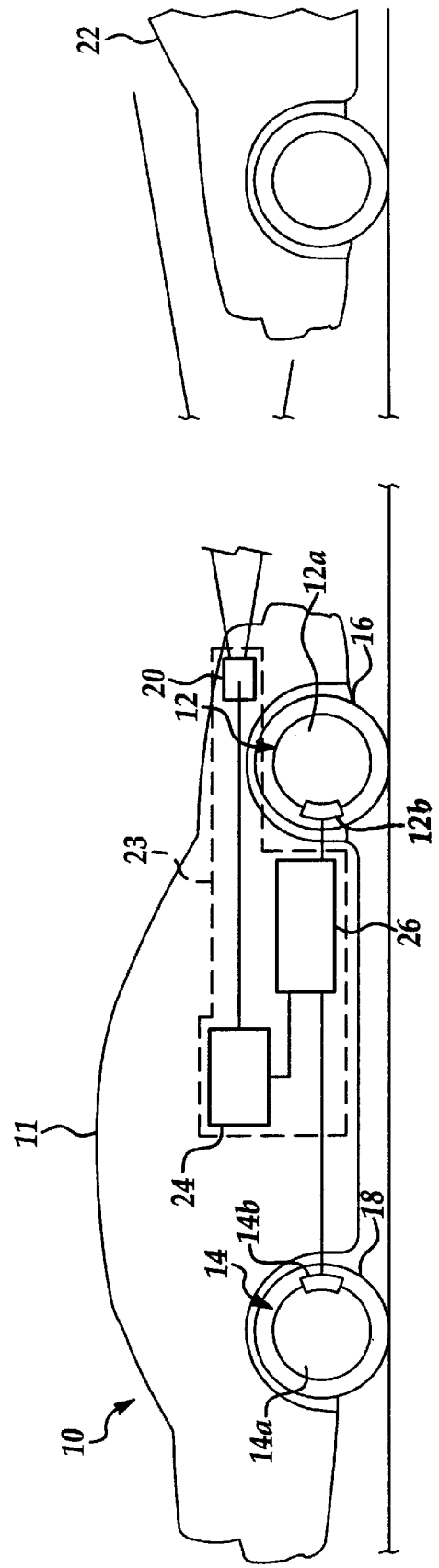
FIG. 1 illustrates an enhanced emergency brake assist system in accordance with one embodiment of the present invention.

In the following figures, the same reference numerals will be used to identify identical components in the various views. The present invention is illustrated with respect to an enhanced emergency brake assist system, particularly suited for the automotive field. However, the present invention is applicable to various other uses that may require an enhanced emergency brake assist system.

Referring to FIG. 1, an emergency brake assist system 10 according to one embodiment of the present invention will be described. A vehicle 11 is provided with a brake system 26 having brake mechanisms 12 and 14 for front and rear wheels 16 and 18, respectively. In one aspect of the invention, brake mechanisms 12 and 14 comprise disc rotors 12a and 14a rotating with wheels 16 and 18, calipers 12b and 14b for braking the rotation of disc rotors 12a and 14a when hydraulic fluid for braking control is supplied. Further, vehicle 11 comprises a forward detection apparatus 20 for detecting the distance between the driving vehicle 11 and the leading vehicle 22 by irradiating laser beams, infrared, radar, microwave or equivalent detection means. Vehicle 11 also includes an emergency brake assist apparatus 23 having a controller 24 receiving signals from the forward detection apparatus 20.

The intention of the present invention is to mitigate or avoid imminent frontal contact by means of automatic brake application. Application of the present invention should only occur when the opportunity to steer away from the threat is passed. Preliminary efficiency estimations show that contact with low relative speed can be avoided; at higher relative speed, the contact speed may be significantly reduced.

Figure 2:
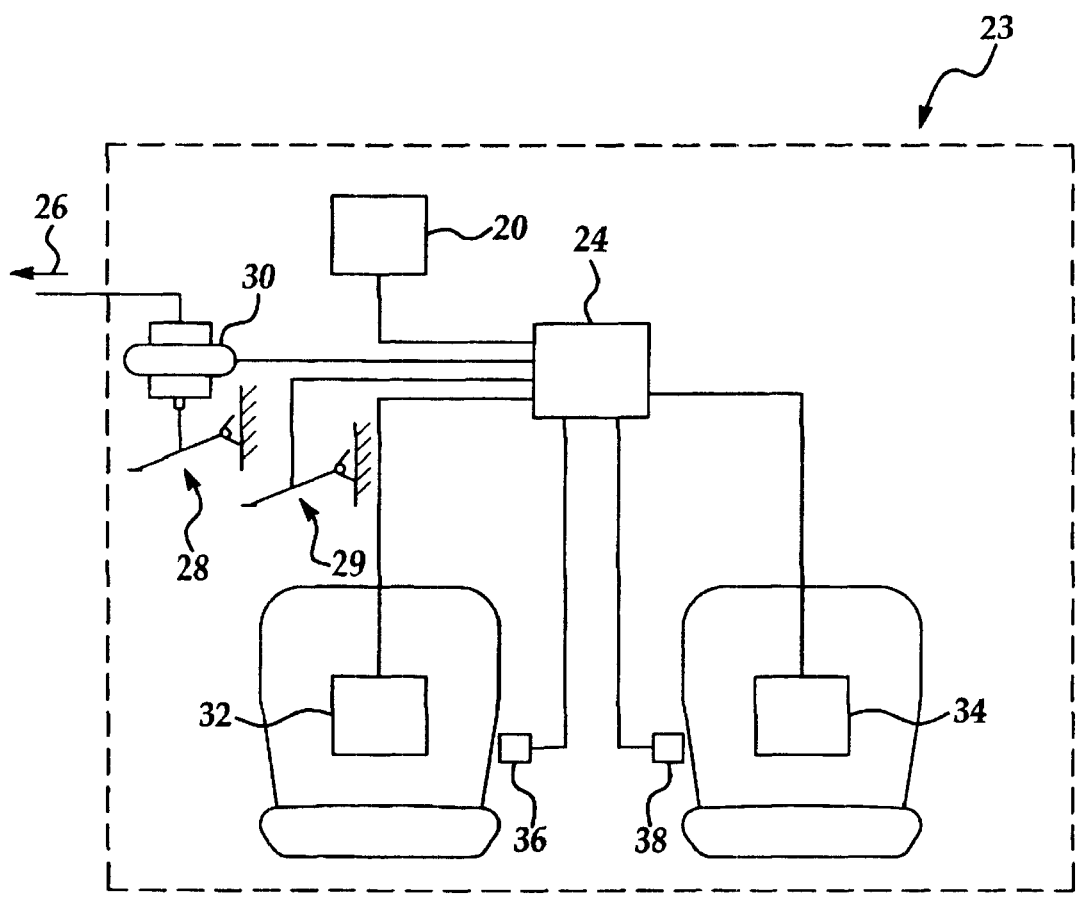
FIG. 2 is an enhanced emergency brake assist apparatus in accordance with one embodiment of the present invention.

Referring to FIG. 2, an emergency brake assist apparatus 23 according to one embodiment of the present invention will be described. A brake pedal 28 operated by the driver (not shown) exerts a brake pedal force upon a variable brake booster 30. The braking system 26 is coupled to the variable brake booster 30 that produces a variable brake booster force causing the braking system 26 to exert a braking force proportional to the pedal force. An accelerator pedal 29 controls vehicle speed and is coupled to an accelerator position sensor. When the forward detection apparatus 20 detects an imminent contact, it notifies the driver of an imminent contact and signals controller 24.

Controller 24 automatically applies brake force upon imminent collision indication, but only when accelerator pedal 29 is fully released as determined by a signal from the accelerator pedal sensor. Under certain conditions vehicle 11 may be operating without use of accelerator pedal 29. These conditions include, but are not limited to, use of cruise control or when the vehicle is coasting. Under these "foot off accelerator pedal" conditions, upon imminent collision indication, controller 24 increases the variable brake booster force such that the braking system 26 exerts an amplified braking force proportional to the brake pedal force. In either case, the enhanced emergency brake assist apparatus applies a braking force upon imminent contact indication that may be supplemented by force applied by the driver.

In an alterative embodiment of the present invention, apparatus 23 includes a driver present switch 32, a passenger present switch 34, a driver seatbelt switch 36, and a passenger seatbelt switch 38. If the driver seatbelt switch 36 indicates that the driver is unbuckled, then apparatus 23 will apply a reduced automatic braking force. Likewise, if the passenger present switch 34 and the passenger seatbelt switch 38 indicate that a passenger is present and unbuckled, then apparatus 23 will apply a reduced automatic braking force. In either case, the system may reduce braking force to the point that the system operates in a normal mode.

The present invention requires a brake booster that has the ability to vary the gain of the brake pedal characteristic. Typically, this is only possible with electro-hydraulic or electro-mechanical brake systems. A conventional brake system with an electronically controlled active booster (i.e. Teves Mk25) does not offer similar functionality. In the latter case, the ability for the driver to control the deceleration continuously during active booster activation is lost. The reason is that pedal pressure cannot be measured accurately during booster activation. The automatic braking action must consequently be enabled/disabled by a so-called "release switch". This concept also implies that full braking power has to be applied during activation, because once the active booster is activated, the brake pedal pressure cannot be measured accurately any longer.

Figure 3:
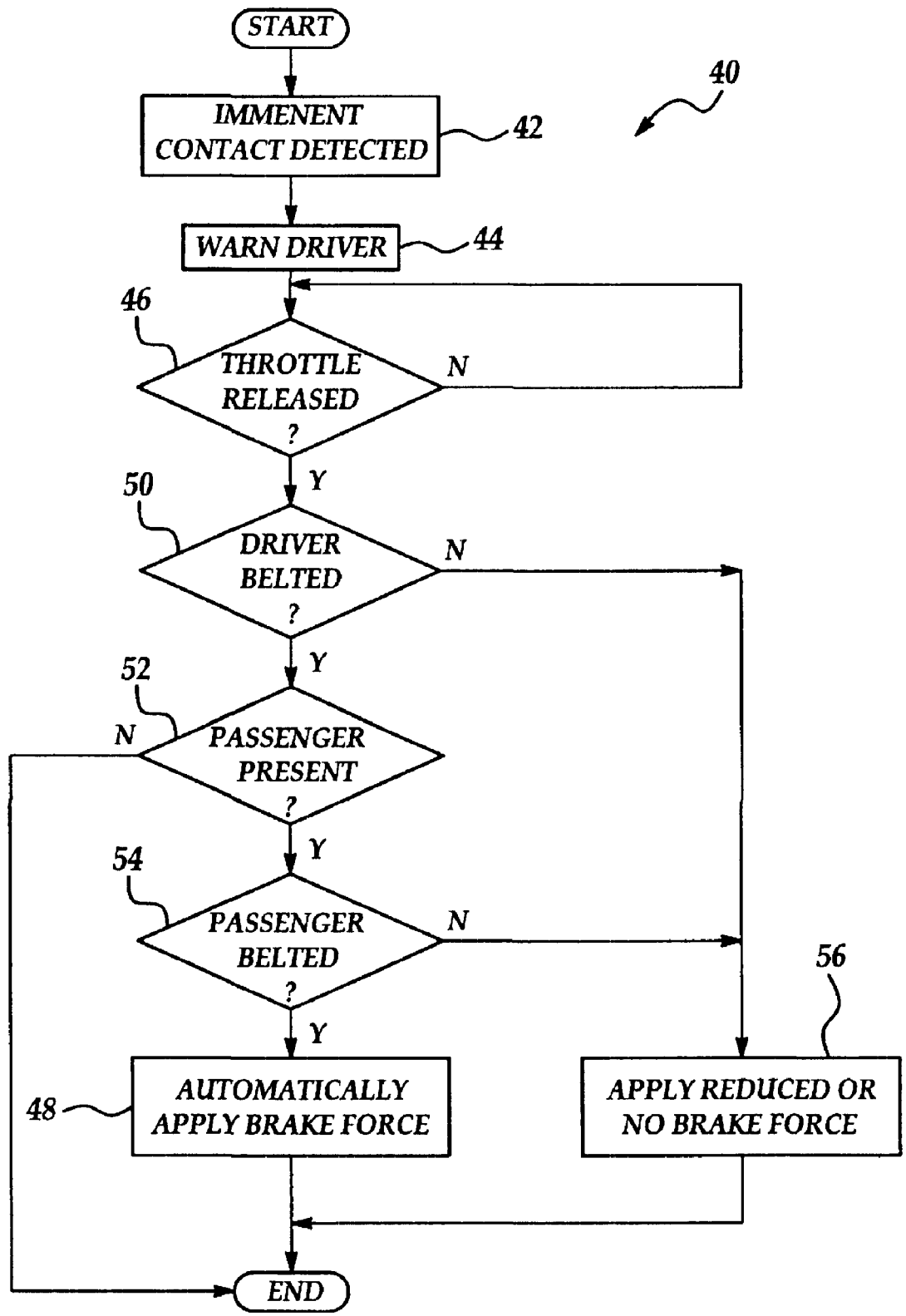
FIG. 3 depicts a flow chart of an enhanced method for providing emergency brake assistance in accordance with one embodiment of the present invention.

Referring to FIG. 3, a method for providing enhanced emergency brake assistance 40 in accordance with one embodiment of the present invention is illustrated. Method 40 begins with step 42 by detecting an imminent contact. Upon detection of an imminent contact the sequence proceeds to step 44 by notifying the driver of the imminent contact. This warning may include an audible signal or a visual signal, such as a telltale or head-up display. The sequence then proceeds to step 46, where the position for accelerator pedal 29 is monitored. If accelerator pedal 29 is not fully released, then the method remains in step 46 and continues to monitor the position of accelerator pedal 29. If accelerator pedal 29 is fully released, then the sequence proceeds to step 48. In step 48, the braking system 26 exerts a predetermined braking force to vehicle 11. A brake pedal force applied by the driver may supplement this braking force.

In an alternative embodiment of the present invention, method 40 also includes additional steps 50, 52, and 54 between steps 46 and 48. In step 50, the driver seatbelt status is determined. If the driver seatbelt is buckled, then the sequence proceeds to step 48 where automatic braking force is applied. If the driver seatbelt is not buckled, then the sequence proceeds to step 56 where the automatic braking force is reduced or disabled. In step 52, the presence of a passenger is determined. If a passenger is not present, then the sequence proceeds to step 48 where automatic braking force is applied. If a passenger is present, then the sequence proceeds to step 54. In step 54, the passenger seatbelt status is determined. If the passenger seatbelt is buckled, then the sequence proceeds to step 48 where automatic braking force is applied. If the passenger seatbelt is not buckled, then the sequence proceeds to step 56 where the automatic braking force is reduced or disabled.

Figure 4:
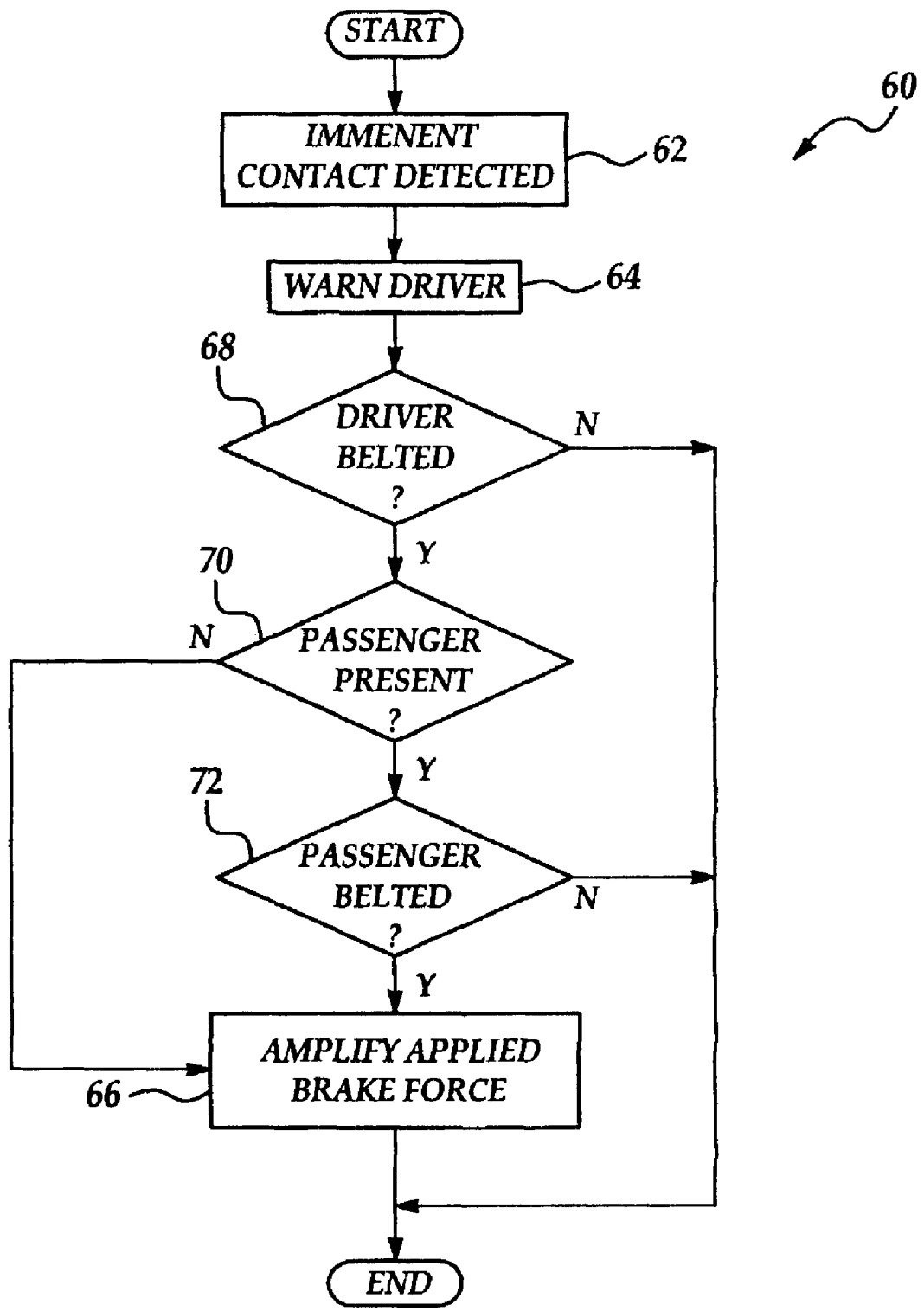
FIG. 4 depicts a flow chart of an alternative method for providing emergency brake assistance in accordance with one embodiment of the present invention.

Referring to FIG. 4, a flow chart of an alternative method 60 for providing enhanced emergency brake assistance in accordance with one embodiment of the present invention is illustrated. If vehicle 11 is operated with cruise control active, or if a collision imminent state is entered with throttle position released, i.e., coasting, method 60 may be enabled, as method 40 does not apply to those cases. Method 60 begins with step 62 by detecting an imminent contact. Upon detection of an imminent contact the sequence proceeds to step 64 by notifying the driver of the imminent contact. This warning may include an audible signal or a visual signal, such as a telltale or head-up display. The sequence then proceeds to step 66, by increasing the variable brake booster force by a predetermined factor proportional to force applied to the brake pedal by the driver. The braking system 26 will then exert an amplified braking force proportional to the pedal force.

In an alternative embodiment of the present invention, method 60 also includes additional steps 68, 70, and 72 between steps 64 and 66. In step 68, the driver seatbelt status is determined. If the driver seatbelt is buckled, then the sequence proceeds to step 66 where amplified braking force is enabled. If the driver seatbelt is not buckled, then the sequence ends and amplified braking force is disabled. In step 70, the presence of a passenger is determined. If a passenger is not present, then the sequence proceeds to step 66 where amplified braking force is enabled. If a passenger is present, then the sequence proceeds to step 72. In step 72, the passenger seatbelt status is determined. If the passenger seatbelt is buckled, then the sequence proceeds to step 66 where amplified braking force is enabled. If the passenger seatbelt is not buckled, then the sequence ends and amplified braking force is reduced.

The method and system of the present invention reduces kinetic energy in frontal contacts by enhancing driver performance during imminent contact situations. Additionally, the present invention maintains standard braking levels when an occupant is unbelted.

From the foregoing, it can be seen that there has been brought to the art a new and improved enhanced emergency brake assist system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An enchanced emergency brake assist apparatus comprising:
    an accelerator pedal coupled to an accelerator position sensor, said accelerator position sensor being operative to generate an accelerator position signal;
    a braking system coupled to a variable brake booster, said variable brake booster being operative to produce a variable brake booster force;
    a driver seatbelt switch operative to generate a driver unbuckled signal when a drive seatbelt is unbuckled;
    a forward detection apparatus having control logic operative to detect an imminent contact and generate an imminent contact signal; and
    a controller coupled to said variable brake booster and said driver seatbelt switch, said controller being operative to receive said accelerator position signal, said driver unbuckled signal, and said imminent contact signal, said controller including control logic operative to automatically apply said variable brake booster force in response to said accelerator position signal and said imminent contact signal when said accelerator pedal transitions from a depressed position to a fully released position and reduce said automatic braking force when said driver seatbelt is unbuckled.

2. The enhanced emergency brake assist apparatus as recited in claim 1, comprising:
    a brake pedal coupled to said variable brake booster, said brake pedal exerting a pedal force upon said variable brake booster wherein said braking system exerts a braking force proportional to said pedal force during normal operation; and
    said controller including control logic operative to increase said variable brake booster force in response to said imminent contact signal, wherein said braking system exerts an amplified braking force proportional to said brake pedal force.

3. The enhanced emergency brake assist apparatus as recited in claim 2, wherein said braking system exerts an amplified braking force proportional to said brake pedal force when a cruise control function is active.

4. The enhanced emergency brake assist apparatus as recited in claim 1, wherein said forward detection apparatus includes a forward contact warning apparatus, said forward contact warning apparatus operative to notify a driver of said imminent contact.

5. The enhanced emergency brake assist apparatus as recited in claim 1, further comprising a passenger present switch operative to generate a passenger present signal when a passenger is present in a passenger seat, said passenger present switch being coupled to said controller.

6. The enhanced emergency brake assist apparatus as recited in claim 5, further comprising a passenger seatbelt switch operative to generate a passenger unbuckled signal when a passenger seatbelt is unbuckled, said passenger seatbelt switch being coupled to said controller.

7. The enhanced emergency brake assist apparatus as recited in claim 6, wherein said controller includes control logic operative to reduce said automatic braking force when said passenger is present and said passenger seatbelt is unbuckled.

8. An enhanced emergency brake assist system for a vehicle comprising:
    an accelerator pedal located in the vehicle and coupled to an accelerator position sensor, said accelerator position sensor being operative to generate an accelerator position signal;
    a braking system located in the vehicle and coupled to a variable brake booster, said variable brake booster being operative to produce a variable brake booster force;
    a driver seatbelt switch operative to generate a driver unbuckled signal when a driver seatbelt is unbuckled;
    a forward detection apparatus located in the vehicle and having control logic operative to detect an imminent contact and generate an imminent contact signal, said forward detection apparatus operative to notify a driver of said imminent contact; and
    a controller located in the vehicle, coupled to said variable brake booster and said driver seatbelt switch, said controller being operative to receive said accelerator position signal, said driver unbuckled signal, and said imminent contact signal, said controller including control logic operative to automatically apply said variable brake booster force in response to said accelerator position signal and said imminent contact signal when said accelerator pedal transitions from a depressed position to a fully released position and reduce said automatic braking force when said driver seatbelt is unbuckled.

9. The enhanced emergency brake assist system for a vehicle as recited in claim 8, comprising:
    a brake pedal coupled to said variable brake booster, said brake pedal exerting a pedal force upon said variable brake booster wherein said braking system exerts a braking force proportional to said pedal force during normal operation; and
    said controller including control logic operative to increase said variable brake booster force in response to said imminent contact signal, wherein said braking system exerts an amplified braking force proportional to said brake pedal force.

10. The enhanced emergency brake assist system for a vehicle as recited in claim 8, wherein said braking system exerts an amplified braking force proportional to said brake pedal force when a cruise control function is active.

11. The enhanced emergency brake assist system as recited in claim 8, further comprising a passenger present switch operative to generate a passenger present signal when a passenger is present in a passenger seat, said passenger present switch being coupled to said controller.

12. The enhanced emergency brake assist system as recited in claim 11, further comprising a passenger seatbelt switch operative to generate a passenger unbuckled signal when a passenger seatbelt is unbuckled, said passenger seatbelt switch being coupled to said controller.

13. The enhanced emergency brake assist system as recited in claim 12, wherein said controller includes control logic operative to reduce said automatic braking force when said passenger is present and said passenger seatbelt is unbuckled.

\* \* \* \* \*